United States Patent [19]

Swayne

[11] Patent Number: 4,815,216

[45] Date of Patent: Mar. 28, 1989

[54] RIM ENGAGING FINGER FOR A WHEEL CLAMP

[75] Inventor: Ronald D. Swayne, Sherwood, Ark.

[73] Assignee: FMC Corporation, Chicago, Ill.

[21] Appl. No.: 57,418

[22] Filed: Jun. 3, 1987

[51] Int. Cl.⁴ .................................... G01B 5/255
[52] U.S. Cl. ............................ 33/203.18; 33/288
[58] Field of Search ........... 33/203.18, 203.19, 288, 33/299, 336; 248/201, 205.1, 225.31; 356/155

[56] References Cited

U.S. PATENT DOCUMENTS

| | | | |
|---|---|---|---|
| 2,475,502 | 7/1949 | Holmes | 248/201 |
| 2,582,427 | 1/1952 | Greenleaf | 33/203.18 |
| 2,627,123 | 2/1953 | Taber | 33/336 |
| 4,185,917 | 1/1980 | Alsina | 33/336 |
| 4,285,136 | 8/1981 | Ragan | 33/203 |
| 4,335,519 | 6/1982 | Alsina | 33/336 |
| 4,337,581 | 7/1982 | Eck | 33/336 |
| 4,363,175 | 12/1982 | Hedahl | 33/336 |
| 4,377,038 | 3/1983 | Ragan | 33/203 |

FOREIGN PATENT DOCUMENTS

| | | | |
|---|---|---|---|
| 1163838 | 9/1969 | United Kingdom | 33/203.18 |
| 2025064 | 1/1980 | United Kingdom | 33/336 |

Primary Examiner—Harry N. Haroian
Attorney, Agent, or Firm—H. M. Stanley; R. C. Kamp; R. B. Megley

[57] ABSTRACT

A rim engaging finger is configured to engage a wide variety of passenger vehicle and truck wheel rims, so that a wheel clamp upon which an array of three of the fingers are mounted may be attached to the wheel rims. The clamp is configured to carry a variety of wheel alignment devices. The rim engaging finger is rotatable in its position on the clamp so that its tip may be put in contact with the inside or the outside of the periphery of a vehicle wheel rim. Additionally, fallow grooves on the finger may be put in contact with the fallow of a vehicle wheel rim for supporting the clamp on the wheel. An inner knife edge is also included to provide contact with certain wheel rim configurations by the array of fingers for clamp mounting purposes.

11 Claims, 3 Drawing Sheets

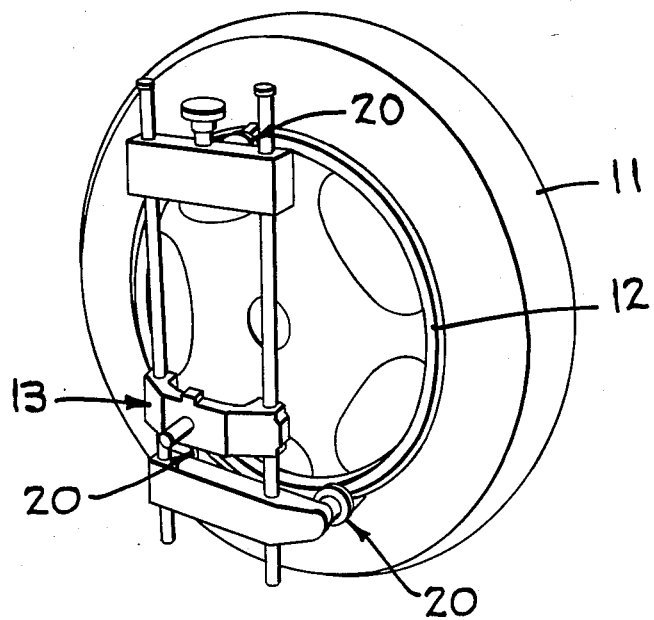
FIG_1
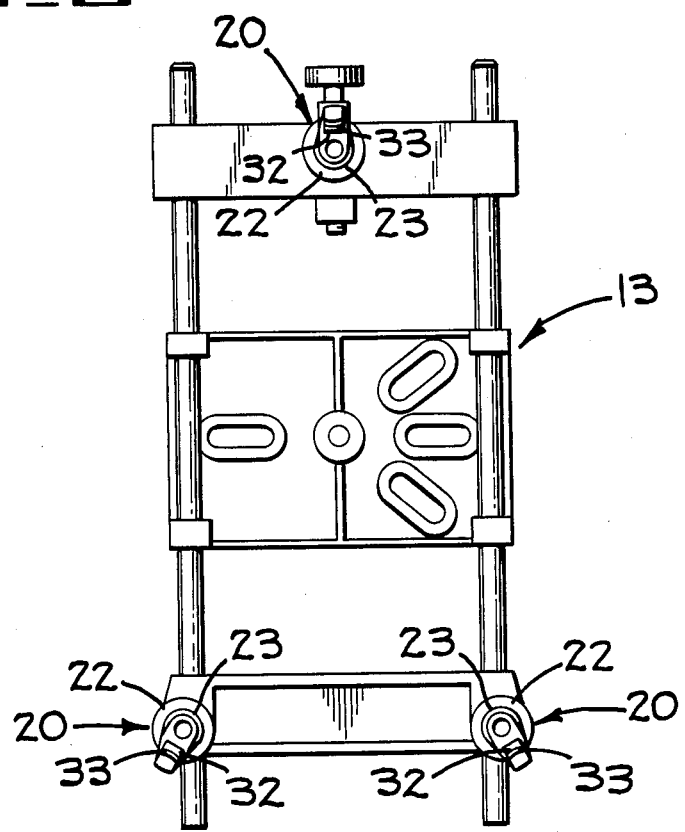
FIG_2

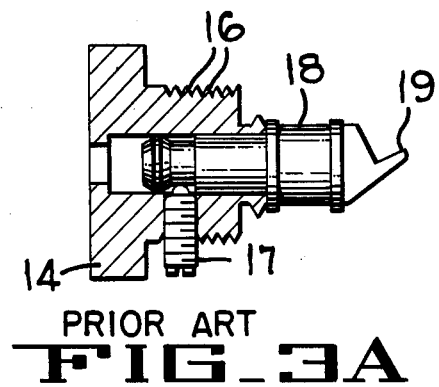
PRIOR ART
FIG_3A
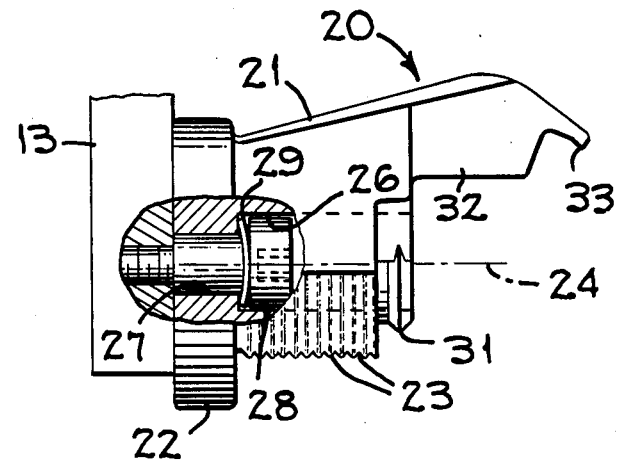
FIG_3B
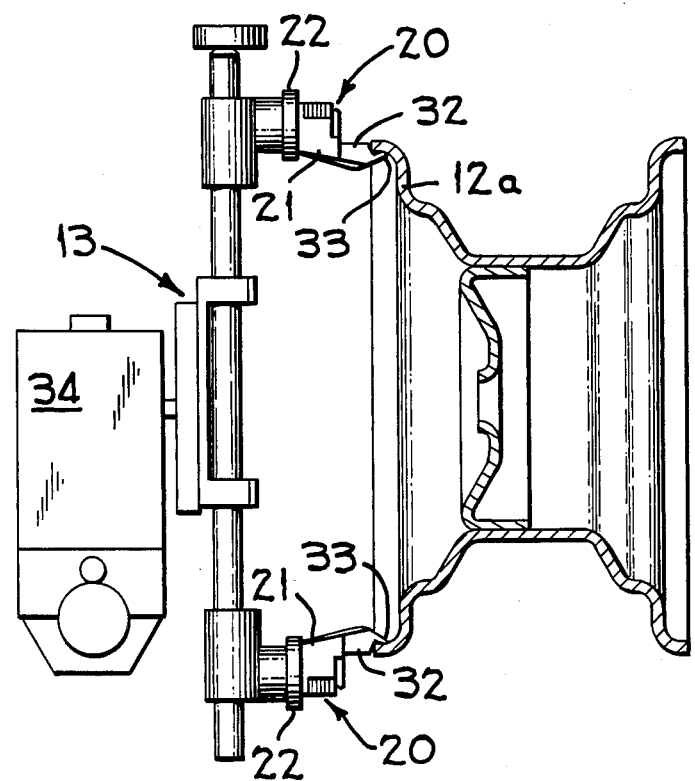
FIG_4
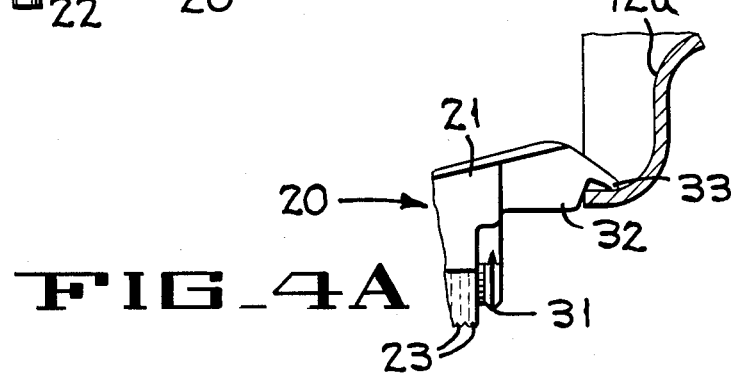
FIG_4A

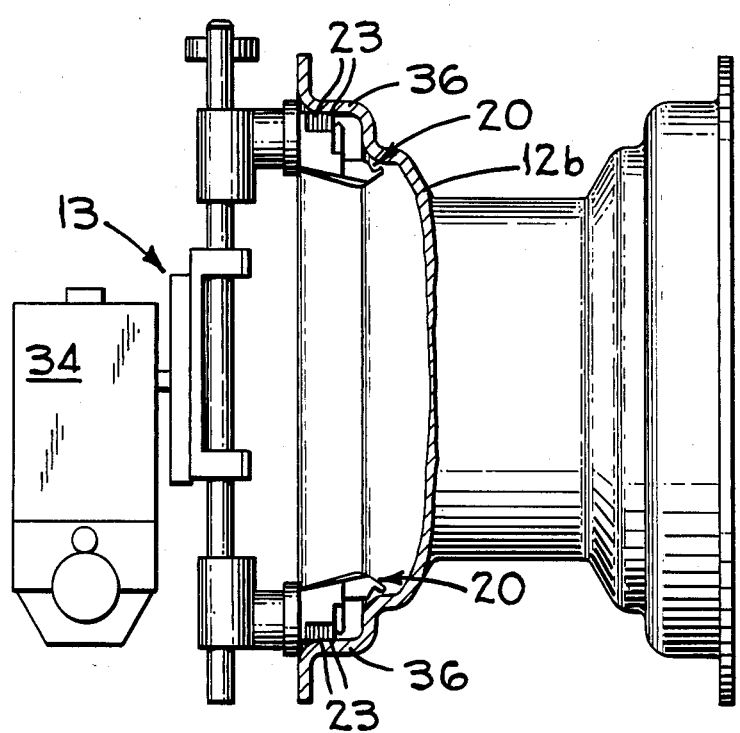
FIG_5
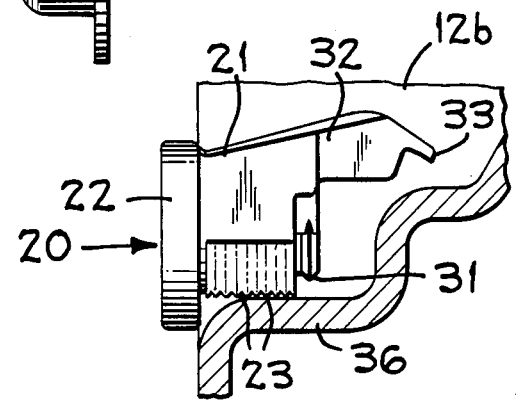
FIG_5A
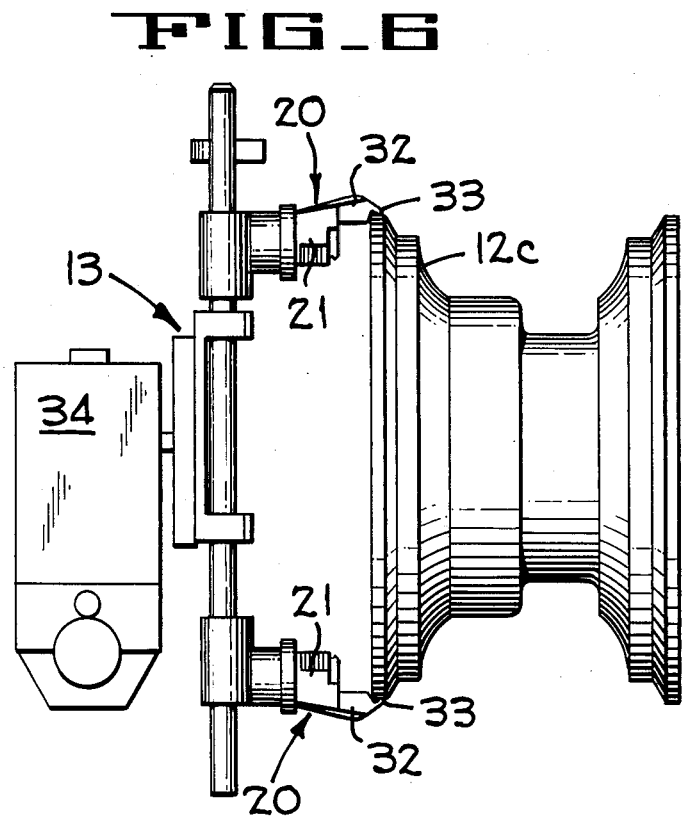
FIG_6
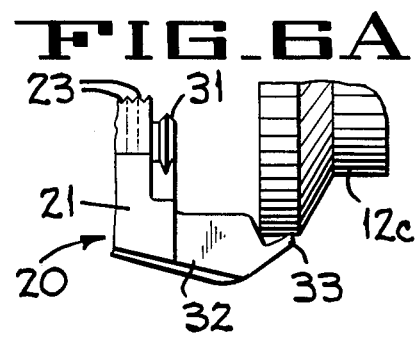
FIG_6A

RIM ENGAGING FINGER FOR A WHEEL CLAMP

BACKGROUND OF THE INVENTION

Field of the Invention

This invention relates to a rim engaging finger for use on a vehicle wheel clamp, and more particularly to such a rim engaging finger which is useful with practically any vehicle wheel configuration.

SUMMARY OF THE INVENTION

A universal wheel rim engaging finger is disclosed for mounting on a wheel clamp which is utilized to engage a vehicle wheel. Means for mounting the rim engaging finger on the wheel clamp is provided so that the finger is movable rotationally about a finger axis. An extension portion is formed on the rim engaging finger which extends in a diverging direction relative to the finger axis. A sharp knife edged projects inwardly toward the finger axis from the distal end of the extension portion. Thus, sharp knife edged tooth is selectively engageable with an inner and an outer peripheral surface on the vehicle wheel rim.

In another aspect of the invention a universal wheel rim engaging finger is disclosed which is mountable on a wheel clamp to be applied to a wheel rim and tire assembly on a vehicle. A finger body has an integral mounting base attached thereto which has a rotation axis extending therethrough. An extension member is formed on the finger body extending therefrom in a direction divergent from the rotation axis means is provided for attaching the mounting base to the wheel clamp for rotation about the rotation axis. A sharp knife edged rim contact tooth is located at the distal end of the extension member extending inwardly toward said rotation axis, whereby the finger body and rim contact tooth are rotatable on the wheel clamp about the rotation axis to bring the rim contact tooth into biting contact selectively with an inner and outer peripheral surface on the wheel rim while clearing the rim and the tire in both selected contact orientations.

BRIEF DESCRIPTION OF THE DRAWINGS

FIG. 1 is a perspective view of a wheel clamp mounted on a vehicle wheel.

FIG. 2 is an elevation view of a wheel clamp mountable on a vehicle wheel.

FIG. 3A is a sectional view of an old art wheel rim engaging finger.

FIG. 3B is a partial sectional view of the wheel rim engaging finger of the present invention.

FIG. 4 is a sectional view of a vehicle wheel with the wheel rim engaging finger of the present invention in engagement therewith.

FIG. 4A is a detailed view taken from FIG. 4.

FIG. 5 is a sectional view of a vehicle wheel showing the wheel rim engaging finger of the present invention in engagement therewith.

FIG. 5A is a detail view taken from FIG. 5.

FIG. 6 is a sectional view of a vehicle wheel rim showing the wheel rim engaging finger of the present invention in engagement therewith.

FIG. 6A is a detail view taken from FIG. 6.

DESCRIPTION OF THE PREFERRED EMBODIMENT

In FIG. 1 a vehicle wheel assembly 11 has a vehicle wheel rim 12 included therein. A vehicle wheel clamp 13 is shown mounted in three point contact with the wheel rim through rim engaging fingers extending inwardly from the clamp toward the rim. The fingers are not clearly shown in FIG. 1. The wheel clamp 13 is used to mount wheel alignment instruments on the wheel in a predetermined relationship with the wheel plane of rotation and rotational axis.

A typical wheel clamp for mounting on wheel rims is shown at 13 in FIG. 2. This particular wheel clamp is fully described in U.S. Pat. No. 4,285,136, Marshal P. Ragan, which issued Aug. 25, 1981 and is currently assigned to the assignee of the instant application. Alternative forms of wheel clamp are found in U.S. Pat. Nos. 4,363,175, Richard N. Hedahl, issued Dec. 14, 1982 and U.S. Pat. No. 4,377,038, Marshal P. Ragan, which issued Mar. 22, 1983. All of these wheel clamps perform the function of supporting wheel alignment instrument packages in predetermined relationship with a vehicle wheel plane and axis of rotation.

FIG. 3A is a wheel rim engaging finger which has been utilized in the past with the aforementioned wheel clamps. This old art rim engaging finger is a two part device, wherein a base portion 14 has circumferential fallow grooves 16 therearound and a radial threaded hole therethrough to accept a threaded set screw 17. A separate finger extension 18 is formed to enter a centrally located bore in the base 14 which is intersected by the set screw 17. The finger extension when inserted in the base bore is fixed in place by engagement with the set screw 17. The finger extension extends from the base along the cylindrical axis of the base. The finger extension has a wedge grip 19 at the end thereof which is utilized to contact the rim of a vehicle wheel to support a wheel clamp thereon.

In FIG. 3B a wheel rim engaging finger 20 of the present invention is shown in section having a finger body 21 attached to a mounting base portion 22 of the finger. The finger body has a plurality of fallow grooves 23 formed therein which extend in an arc about a centrally located rotation axis 24 which in turn extends through the finger body and the mounting base. The finger body has a counterbore 26 therein extending along the rotation axis. Counterbore 26 is joined with a centrally located bore 27 through the mounting base 22. The counterbore 26 and bore 27 are formed to accept a socket head shoulder screw shown at 28 which has a threaded end portion adapted to engage a threaded hole formed in the structure of the wheel clamp 13. A wave washer 29 is disposed between the head of the shoulder screw 28 and the bottom of the bore 26 so that when the shoulder screw is firmly seated in the threaded hole in the wheel clamp 13, a frictionally inhibited rotation of the wheel rim engaging finger about the axis 24 may be undertaken.

The finger body 21 has formed thereon, in a position spaced from the fallow grooves 23, an inner knife edge 31 which extends in an arc about the central rotation axis 24. Additionally, an integral finger extension 32 projects from the finger body 21 in a direction such that it diverges from the central rotation axis 24. An angle of divergence of approximately 15° has been found to be satisfactory for the purposes of this invention. Situated at the distal end of the finger extension 32 is an outer knife edge 33 which projects inwardly toward the central rotation axis 24. The outer knife edge 33 is formed as a type of sharp tooth to facilitate engagement with a wheel rim. Both of the knife edges 31 and 33 are sharp so that they may literally "bite" into and displace a slight amount of the material of a wheel rim with which they are set in contact.

Turning now to FIG. 4, a wheel clamp 13 having a trio of the wheel rim engaging fingers 20 of FIG. 3B extending therefrom is shown mounted on a wheel rim 12a and supporting a wheel alignment instrument 24 in predetermined relationship with the plane and axis of rotation of the rim. Rim 12a is of a configuration that requires contact by the wheel rim engaging fingers 20 at a peripheral rim surface which is internal of the rim. As seen in the detail of FIG. 4A, the finger 20 is oriented so that the outer knife edge or tooth 33 is in "biting" contact with the inner peripheral surface around the edge of the wheel rim 12a. When used in this fashion, the rim engaging finger 20 is rotated about the rotation axis 24 on the wheel clamp 13 so that the tooth 33 is pointing outwardly albeit toward the rotation axis 24 of the finger.

FIG. 5 shows a wheel rim configuration 12b which has a fallow area 36 on the rim as shown. A fallow area is a relatively extensive cylindrical portion on the wheel rim. The clamp 13 is again shown carrying a trio of the wheel rim engaging fingers 20 disclosed herein which are rotated about central axis 24 in the fashion described hereinbefore so that the fallow grooves 23 are brought into contact with the inner surface of the fallow of the wheel rim 12b. The detail of FIG. 5A more clearly illustrates the engagement of the fallow grooves 23 with the fallow area 36 on the wheel rim of FIG. 5. It should be noted that the inner knife edge 31 may be used to contact the fallow area 36 when the fallow area is less extensive FIG. 6 shows a wheel rim 12c which does not have a fallow area, nor is it readily engaged at the inner periphery of the wheel rim. Magnesium or aluminum wheels in some shapes are illustrative of this type of wheel rim. Consequently, the wheel rim engaging fingers 20 mounted on the wheel clamp 13 are rotated about their respective rotation axes 24 so that the teeth or knife edges 33 on the fingers are directed inwardly of the rim, albeit toward the rotation axes 24 of the fingers. In this position, the outer knife edges 33 are brought into contact with the outer periphery of the wheel rim 12c to thereby support the wheel clamp 13 and the alignment instrument 34 thereon for alignment purposes. The detail of FIG. 6A shows the outer knife edge or tooth 33 in "biting" engagement with the outer periphery of the wheel rim 12c.

It should be noted in each of the illustrations of FIGS. 4, 5 and 6 that the divergence of the finger extension 32 from the central rotation axis 24 allows the finger extension to clear portions of the wheel rim when the fallow grooves 23 (FIGS. 5 and 5A) or the inner knife edge 31 (FIG. 3B) are used to contact an inner peripheral surface of a wheel rim for supporting the clamp 13. It may be seen that the wheel rim engaging finger of FIG. 3A could not be so used. That is why the old art finger of FIG. 3A is a two-part device. If that finger was to be used with the wheel rim 12b of FIG. 5, the set screw 17 would have to be removed to allow release and removal of the finger extension 18 from the finger body 16 so that the fallow grooves thereon could be placed within the fallow of the wheel without interference from the finger extension 18. Thus, an advantage and convenience is realized from the wheel rim engaging finger 20 of FIG. 3B since the mounting base 22, finger body 21 and extension member 32 are formed integrally in unitary construction.

Although the best mode contemplated for carrying out the present invention has been herein shown and described it will be apparent that modification and variation may be made without departing from what is regarded to be the subject matter of the invention.

What is claimed is:

1. A universal wheel rim engaging finger for mounting on a wheel clamp, for engaging a vehicle wheel rim with a tire mounted thereon, comprising
    means for mounting said rim engaging finger on said wheel clamp for rotatable movement about a finger axis,
    an extension portion formed on said rim engaging finger extending in a diverging direction relative to said finger axis, and
    a sharp knife edged tooth projecting inwardly toward said finger axis from the distal end of said extension portion, whereby said sharp knife edged tooth is selectively engageable with an inner and an outer peripheral surface near the edge of the vehicle wheel rim in biting contact therewith and clearance is provided between the rim and said extension portion in both engagements.

2. A universal wheel rim engaging finger as in claim 1 comprising means for imparting a friction level to the rotatable movement of said rim engaging finger.

3. A universal wheel rim engaging finger as in claim 1 comprising male fallow grooves extending in an arc about said finger axis, whereby a fallow of the vehicle wheel rim is engageable by said finger.

4. A universal wheel rim engaging finger as in claim 1 comprising an inner knife edge extending in an arc about said finger axis, whereby an inner peripheral surface on the vehicle wheel rim is engageable thereby.

5. A universal wheel rim engaging finger as in claim 1 comprising a unitary formed body rotatable about said finger axis.

6. A universal wheel rim engaging finger as in claim 2 wherein said means for imparting a friction level comprises a shoulder screw and a wave washer.

7. A universal wheel rim engaging finger mountable on a wheel clamp to be applied to a wheel rim and tire assembly on a vehicle, comprising
    a finger body,
    an integral mounting base attached to said finger body having a rotation axis extending therethrough,
    an extension member formed on said finger body extending therefrom in a direction divergent from said rotation axis,
    means for attaching said mounted base to said wheel clamp for rotation about said rotation axis, and
    a sharp knife edged rim contact tooth located at the distal end of said extension member extending inwardly toward said rotation axis, whereby said finger body and rim contact tooth are rotatable on said wheel clamp about said rotation axis to bring said rim contact tooth into biting contact selectively with an inner and an outer peripheral surface on said wheel rim while providing clearance between the rim and said extension member in both selected contact orientations.

8. A universal wheel rim engaging finger as in claim 7 comprising male fallow grooves on said finger body and a knife edge spaced from said fallow grooves, whereby the fallow and inner periphery of the vehicle wheel may be contacted respectively by the rim engaging finger.

9. A unversal wheel rim engaging finger as in claim 7 wherein said means for attaching comprises a shoulder screw and a wave washer, whereby rotation of said finger body is inhibited by friction.

10. A universal wheel rim engaging finger as in claim 1 wherein said extension portion diverging direction is at least 15°.

11. A universal wheel rim engaging finger as in claim 7 wherein said extension member divergent direction is at least 15°.

* * * * *